(12) United States Patent
Götz et al.

(10) Patent No.: US 10,714,884 B2
(45) Date of Patent: Jul. 14, 2020

(54) LAND-BASED ELECTRIC VEHICLE CHARGING PLUG

(71) Applicant: Dr. Ing. h.c. F. Porsche Aktiengesellschaft, Stuttgart (DE)

(72) Inventors: Stefan Götz, Forstern (DE); Jari Rönfanz, Stuttgart (DE); Volker Reber, Michelbach an der Bilz (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 16/246,673

(22) Filed: Jan. 14, 2019

(65) Prior Publication Data
US 2019/0221977 A1 Jul. 18, 2019

(30) Foreign Application Priority Data
Jan. 16, 2018 (DE) .................. 10 2018 100 825

(51) Int. Cl.
| | | |
|---|---|---|
| *H01R 31/06* | (2006.01) | |
| *H01R 13/629* | (2006.01) | |
| *B60L 53/16* | (2019.01) | |
| *H01R 27/00* | (2006.01) | |
| *H01R 13/506* | (2006.01) | |
| *H01R 13/512* | (2006.01) | |

(52) U.S. Cl.
CPC .............. *H01R 31/06* (2013.01); *B60L 53/16* (2019.02); *H01R 13/506* (2013.01); *H01R 13/512* (2013.01); *H01R 13/629* (2013.01); *H01R 27/00* (2013.01); *H01R 2201/26* (2013.01)

(58) Field of Classification Search
CPC .... H01R 2201/26; H01R 27/00; H01R 31/06; H01R 13/512; H01R 13/629; H01R 13/506; B60L 53/16
See application file for complete search history.

(56) References Cited

U.S. PATENT DOCUMENTS

| | | | | |
|---|---|---|---|---|
| 7,075,270 B1 * | 7/2006 | Blum | .................. | H01M 10/46 320/114 |
| 8,128,440 B2 * | 3/2012 | Matsumoto | ............. | B60L 53/16 439/731 |

(Continued)

FOREIGN PATENT DOCUMENTS

| | | |
|---|---|---|
| CN | 105846220 A | 8/2016 |
| CN | 105896212 A | 8/2016 |

(Continued)

OTHER PUBLICATIONS

Chinese Office Action for Chinese Application No. 201910026873.2, dated Mar. 9, 2020, 8 pages.

*Primary Examiner* — Briggitte R. Hammond
(74) *Attorney, Agent, or Firm* — RatnerPrestia

(57) ABSTRACT

A land-based electric vehicle charging plug has a plug base and a separate and exchangeable interface which is detachably fastened to the plug base. The plug base has an electrically non-conductive base body and at least one charging current base contact. The interface has an electrically non-conductive interface body and at least one charging current interface contact which is plugged-together with the corresponding charging current base contact. The plug base and the interface have a positive guide which forms an insertion funnel.

11 Claims, 5 Drawing Sheets

(56) References Cited

U.S. PATENT DOCUMENTS

| | | | | |
|---|---|---|---|---|
| 8,206,171 | B2* | 6/2012 | Osawa | H01R 13/502 |
| | | | | 439/352 |
| 8,251,742 | B2* | 8/2012 | Takada | H01R 13/504 |
| | | | | 439/589 |
| 8,562,370 | B2* | 10/2013 | Takagi | H01R 13/6275 |
| | | | | 439/345 |
| 9,090,169 | B2* | 7/2015 | Ang | H02J 7/0036 |
| 9,509,095 | B2* | 11/2016 | Ohmura | H01R 13/639 |
| 9,531,103 | B2 | 12/2016 | Fujita et al. | |
| 9,533,587 | B2 | 1/2017 | Krammer | |
| 9,758,046 | B2* | 9/2017 | Harper | B60L 53/68 |
| 9,821,671 | B2* | 11/2017 | Mueller | B60L 11/1818 |
| 10,046,658 | B2* | 8/2018 | Mueller | H01R 31/06 |
| 2011/0223792 | A1* | 9/2011 | Osawa | H01R 13/6275 |
| | | | | 439/345 |
| 2011/0300753 | A1* | 12/2011 | Ichikawa | B60L 3/0069 |
| | | | | 439/620.21 |
| 2014/0084678 | A1 | 3/2014 | Isaac | |
| 2018/0170196 | A1* | 6/2018 | Huang | B60L 11/1818 |

FOREIGN PATENT DOCUMENTS

| | | |
|---|---|---|
| CN | 106532339 A | 3/2017 |
| DE | 102011082092 A1 | 3/2013 |
| DE | 102015203842 A1 | 9/2015 |
| DE | 102015002703 B3 | 5/2016 |
| DE | 112014004814 T5 | 7/2016 |
| JP | 2014203516 A * | 10/2014 |
| WO | 2014144990 A1 | 9/2014 |
| WO | 2016119000 A1 | 8/2016 |

* cited by examiner

LAND-BASED ELECTRIC VEHICLE CHARGING PLUG

CROSS-REFERENCE TO RELATED APPLICATION

This application claims priority to German Patent Application No. DE 10 2018 100 825.2, filed Jan. 16, 2018, which is incorporated by reference herein in its entirety.

FIELD OF THE INVENTION

The invention relates to a land-based electric vehicle charging plug which can be plugged into a vehicle-based charging plug for the purpose of charging a vehicle-based traction battery.

BACKGROUND OF THE INVENTION

The land-based electric vehicle charging plug is part of a land-based charging station for charging a traction battery of an electric vehicle. In contrast to the vehicle-based charging plug, the land-based charging plug is subjected to a high degree of wear since it is used, that is to say is coupled and decoupled, several hundred times up to several thousand times per year. In addition to pure wear of the electrical contacts, the charging plug is moreover also subjected to mechanical loading and possibly mechanically damaged, for example due to falling and hitting the ground.

The land-based charging plugs are therefore exchanged at regular intervals. This can take place, for example, by virtue of the entire charging cable including the land-based charging plug which is fastened thereto being exchanged. To this end, however, the charging column has to be opened and the new charging cable has to be connected by way of its charging column-based end to the charging column.

As an alternative, on the land-based charging plug, only the electrical contacts are exchanged. To this end, the corresponding line cables have to be correspondingly shortened in order to be able to fasten the new electrical contacts to the shortened cable ends, for example by way of soldering or crimping. This method is laborious and very susceptible to faulty implementation since the quality of the charging plug overhauled in this way is very dependent on the care taken by the technician.

CN 105896212 A, which is incorporated by reference herein, discloses a land-based electric vehicle charging plug which can be reconfigured for another connection plug standard using an adapter plug. The adapter plug has a plurality of adapter contacts which are fixedly anchored in the adapter plug and, when the adapter plug is plugged onto the plug base, have to be plugged-together with the corresponding base contacts. If the contacts which correspond to one another are not in exact axial alignment with one another during the plugging-on operation, the plugging-together operation is very difficult. Furthermore, the meeting contact ends of the adapter contacts and of the corresponding base contacts can be deformed or damaged in the event of poor alignment during the plugging-together operation. If the contacts are charging current contacts, poor contact-connection can lead to excessive heating at high charging currents owing to the relatively high non-reactive resistance.

SUMMARY OF THE INVENTION

A land-based electric vehicle charging plug described herein exhibits simple and reliable exchangeability of the electrical contacts.

According to aspects of the invention, the land-based electric vehicle charging plug has a plug base and a separate and exchangeable interface which is detachably fastened to the plug base, wherein the plug base has an electrically non-conductive base body and at least one charging current base contact, the interface has an electrically non-conductive interface body and at least one charging current interface contact which is plugged-together with the corresponding charging current base contact, and the plug base and the interface have positive guidance means which form an insertion funnel.

The land-based electric vehicle charging plug according to aspects of the invention has a plug base and a separate exchangeable interface which is fastened to the plug base but can be exchanged with a few actions. The plug base has at least one electrically non-conductive base body and at least one charging current base contact which is fastened to the or in the base body. The charging current base contact is cast, for example, in a form-fitting manner in the base body.

The interface has an electrically non-conductive interface body and at least one charging current interface contact which is fastened in or to the interface body. In the fitted state of the interface, the charging current interface contact is plugged-together with the corresponding charging current base contact or plugged into said corresponding charging current base contact. A charging current contact is generally intended to be understood to mean an electrically conductive contact body across which the charging current flows, the traction battery of the electric vehicle being charged by said charging current.

In the present case, the proximal direction is always intended to be understood to mean the direction facing the charging column, whereas the distal direction is intended to be understood to mean the opposite direction which faces the vehicle-based charging plug.

The plug base and the interface have positive guidance means which form an insertion funnel and which, when the interface and the plug base are plugged together, particularly preferably allow an initial angular deviation of the interface in relation to the plug base of more than 10° and ultimately reduce said angular deviation to less than 5° in a positive guidance plane. The positive guidance means can be designed in various ways on the plug base and the interface and, when a new and non-worn interface is fitted to the plug base, allow the interface to be mounted onto the plug base with respect to the positive guidance plane initially with a certain degree of rotational inaccuracy. The insertion funnel ensures that the initial actual angular deviation is ultimately reduced to a small angle. In this way, fitting of a new non-worn interface to the plug base is made easier and damage, in particular, to the charging current base contact or to the charging current base contacts is avoided. As a result, a high degree of reproducibility is finally also ensured even when the interface is replaced many times, and a low transfer resistance between the charging current base contact and the corresponding charging current interface contact is ensured after each replacement.

According to a preferred refinement, the positive guidance means is designed in such a way that the contact angular deviation at the time at which the charging current interface contact and the charging current base contact are electrically contact-connected to one another during the plugging-together operation is less than 10°, particularly preferably less than 5°. Therefore, at the moment at which the two charging current contacts come into mechanical contact with one another, the angular deviation is reduced such that the two contacts engage one in the other and can be further pushed together in a sliding manner, but do not butt against one another in a blocking manner.

In addition to the positive guidance means, an elastic guidance means is preferably provided which is designed in such a way that it, in a spring plane which is perpendicular to the positive guidance plane, elastically counteracts an initial angular deviation in the spring plane. The elastic guidance means can be designed in such a way that, as the interface comes closer to the base body, the spring force in the spring plane increases in such a way that finally positive guidance results, in particular at the moment at which the two charging current contacts which correspond to one another finally come into contact and are pushed one into the other.

According to a preferred refinement, the positive guidance means is designed as a lug body which engages into a corresponding lug guide during the plugging-together operation. In this case, the positive guidance plane preferably lies in the main plane of the lug body of flat design.

The elastic guidance means is preferably designed as a lug body which is guided by a corresponding lug guide. In this case, the spring plane is preferably oriented perpendicularly to the main plane of the lug body. The lug guide can be designed, in particular, as a guidance face against which the lug body bears in a flat manner.

Two lateral lug bodies which act in a complementary and/or redundant manner in relation to one another are particularly preferably provided as guidance means. Each of the two lug bodies particularly preferably defines in each case both an elastic guidance means and also a positive guidance means. The two lug bodies can interact with one another in an antagonistic manner as elastic guidance means.

The lug body or the two lug bodies has/have, in principle, an additional stabilizing effect with respect to lateral impacts on the interface, as can occur, for example, when the charging plug hits the ground.

According to a preferred refinement, the lug body tapers in the proximal direction, and preferably tapers in a single or double involute. The corresponding positive guidance means can likewise be designed to taper in a correspondingly complementary manner. This results in positive guidance which initially enforces a relatively large angle correction and ultimately enforces a relatively small angle correction.

The lug body or the two lug bodies is/are preferably associated with the interface, whereas the corresponding positive guidance means, in the form of grooves and/or recesses, are associated with the plug base.

A securing element is preferably provided, the interface being fixed to the plug base by said securing element. The securing element cannot be opened without tools. The tool can be, for example, a special tool, so that unauthorized removal of the securing element is difficult or is rendered impossible. A securing element of this kind can be, for example, a lock which can be opened only using an appropriate key.

BRIEF DESCRIPTION OF THE DRAWING

An exemplary embodiment of the invention will be explained in more detail below with reference to the drawings, in which.

DETAILED DESCRIPTION OF THE INVENTION

Figure 1:
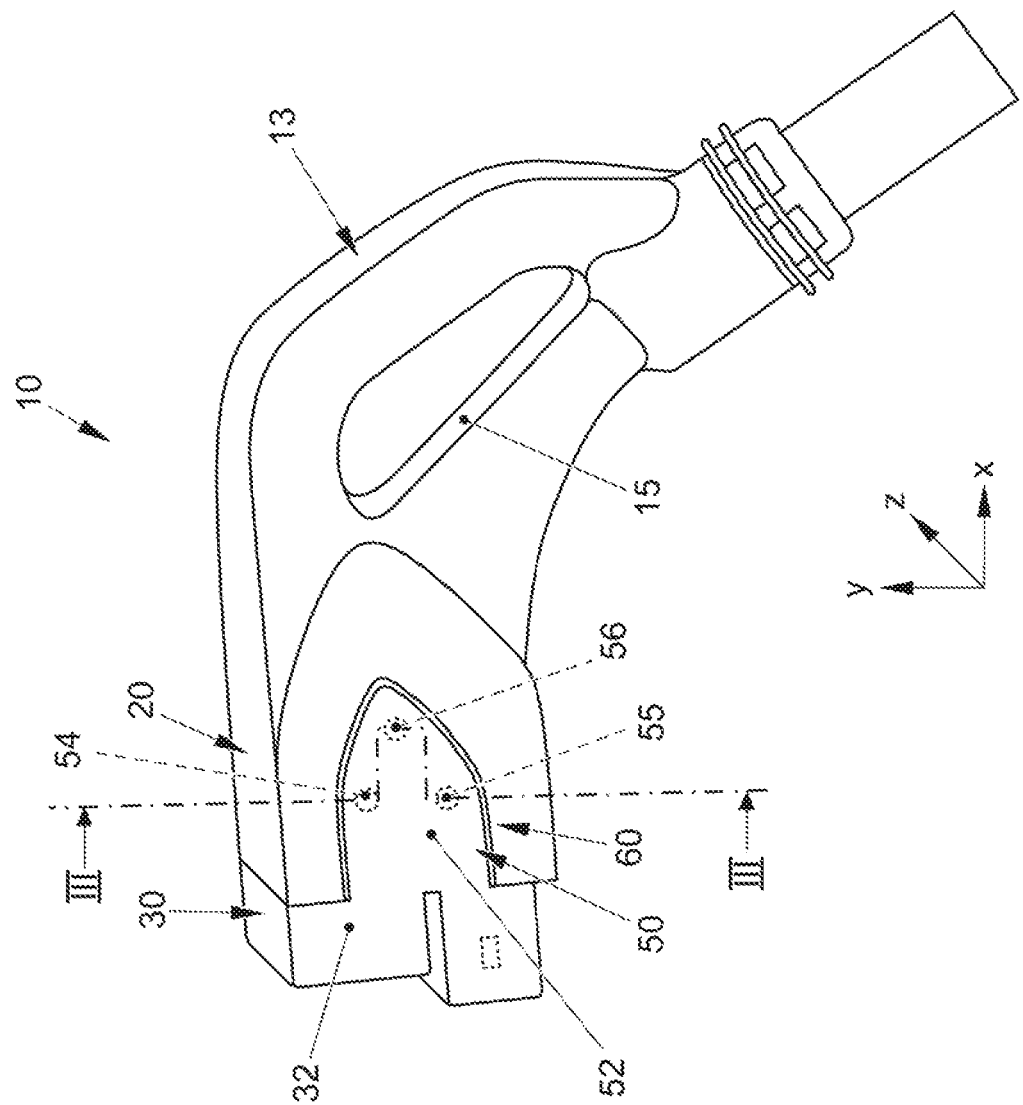
FIG. 1 shows a perspective illustration of a land-based electric vehicle charging plug with an interface fitted to a plug base.
Figure 3:
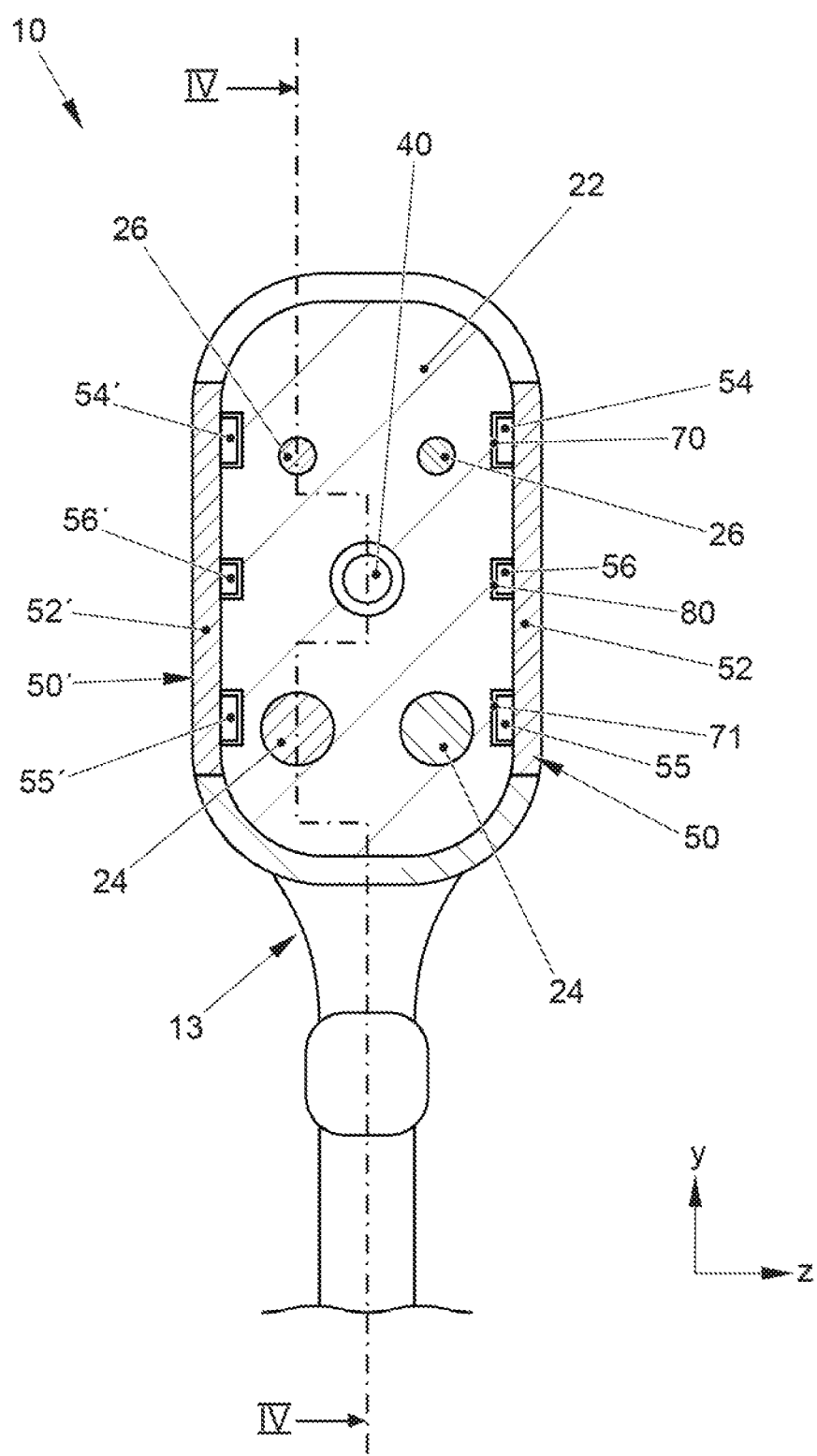
FIG. 3 shows a cross section III-III through the electric vehicle charging plug of FIG. 1.
Figure 4:
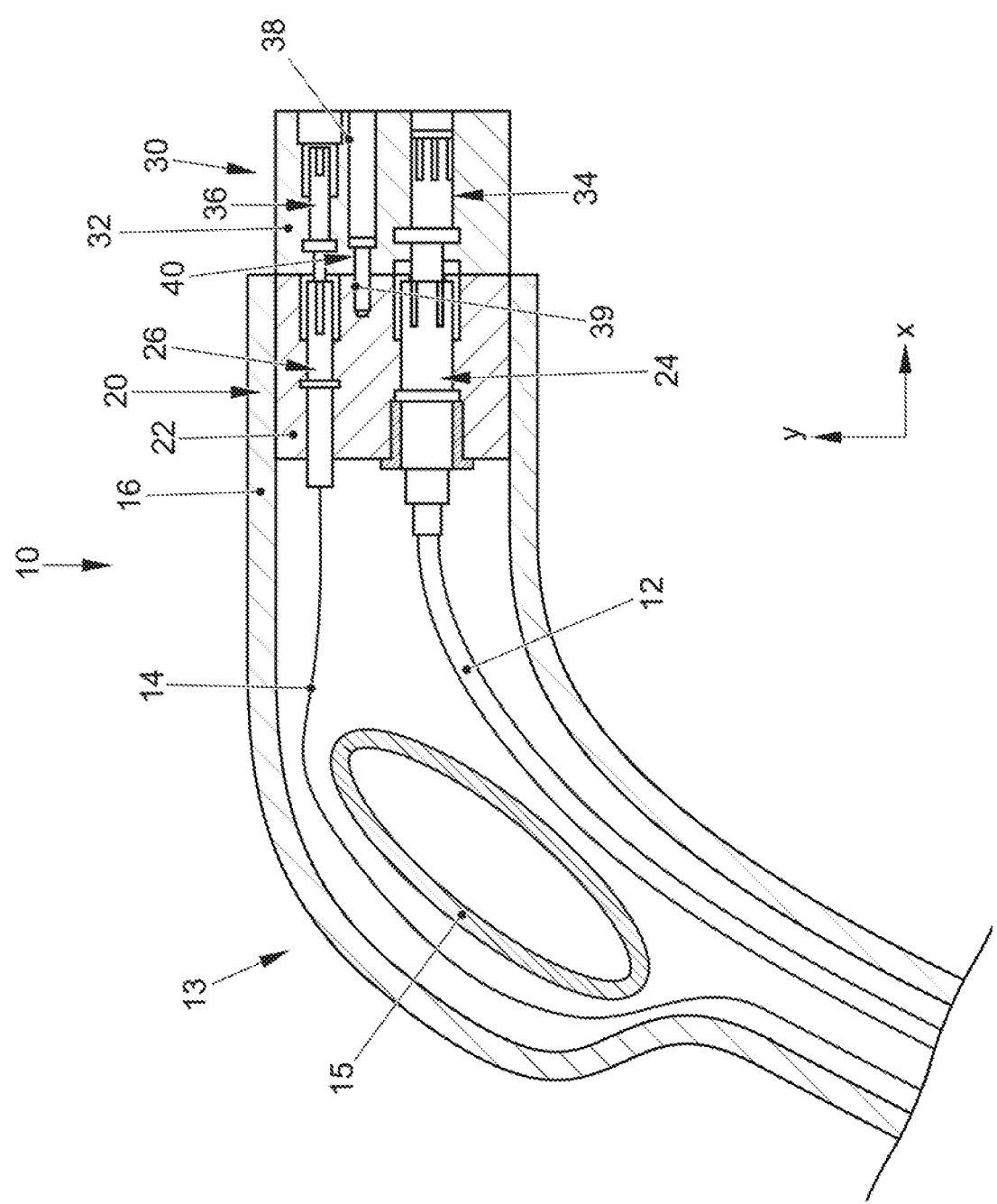
FIG. 4 shows a longitudinal section through the electric vehicle charging plug of FIG. 1.

FIGS. 1, 3 and 4 illustrate an assembled land-based electric vehicle charging plug 10 which is suitable for being plugged into a corresponding vehicle-based charging plug (not illustrated) in order to charge a traction battery of an electric vehicle. The charging plug 10 has a grip part 13 which is formed by a grip part housing 16 and defines a grip opening 15 which can be grasped by the hand of an operator.

A plug base 20 is fixedly anchored at the distal end of the grip part housing 16. The plug base 20 is formed by an electrically non-conductive plastic base body 22 and two charging current base contacts 24 which are fixedly anchored in the base body 22 and two signal base contacts 26. All of the base contacts 24, 26 are fixedly anchored in the base body 22 in such a way that they cannot be removed from the base body 22 without damaging or without destroying the base body 22.

The plug base 20 remains on the grip part housing 16 over the entire lifetime of the charging plug 10 without being replaced. The charging current base contacts 24 are electrically connected to a land-based charging column (not illustrated) by means of an electrical charging line 12. The signal base contacts 26 are each connected to the land-based charging column by means of an appropriate signal line 14. Charging currents of several 100 A are transmitted via the charging lines 12. Exclusively electrical signals are transmitted via the signal lines 14.

A separate removable or exchangeable interface 30 is fastened to the plug base 20, which interface is subjected to relatively high mechanical wear in the field. The interface 30 can be exchanged with relatively little outlay when required, for example in the context of regular maintenance. The interface 30 has an electrically non-conductive plastic interface body 32 in which two charging current interface contacts 34 and also two signal interface contacts 36 are fixed or potted in a form-fitting manner. All of the contacts 24, 26, 34, 36 are electrically conductive and each consist of a metal which is suitable for this purpose.

The interface 30 or the interface body 32 is fixed to the plug base 20 or the base body 22 by way of a securing element 40. In the present case, the securing element 40 is a head-threaded screw which is plugged in a deeply recessed manner in an axially stepped bore 38 of the interface body 32 and which, by way of its threaded shaft, is screwed into a corresponding threaded bore 39 of the base body 22. The securing element 40 has a screw head with which a corresponding special tool can make contact in a form-fitting manner so that the securing element 40 can be screwed in or unscrewed only using the special tool.

Figure 2:
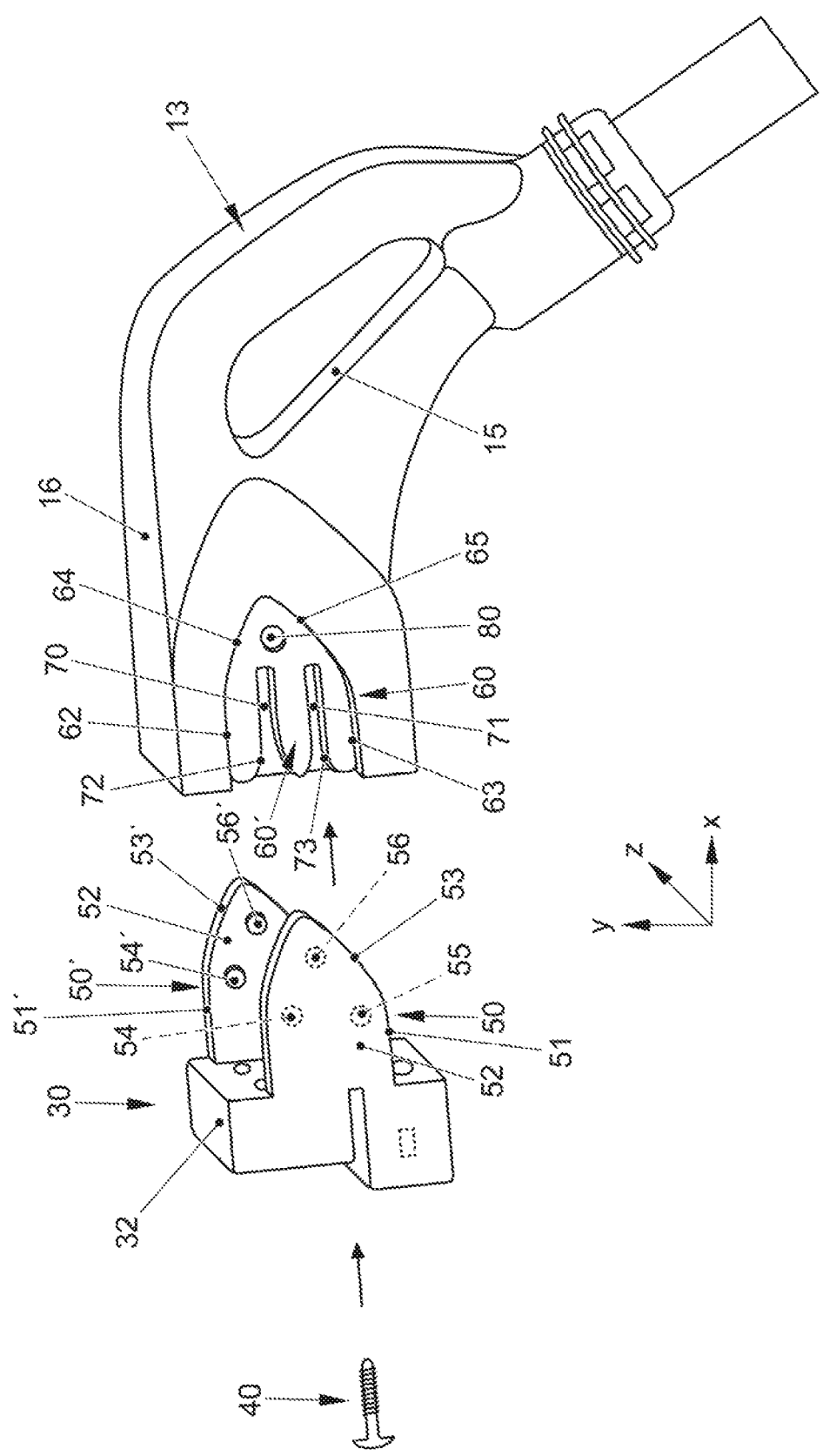
FIG. 2 shows the electric vehicle charging plug of FIG. 1 with an interface which has not yet been fitted during the fitting process.

The plug base 20 and the interface 30 have positive guidance means which have a funnel-like design and, when the interface 30 is plugged onto the plug base 20, as is indicated in FIG. 2, allow an initial angular deviation of, in the present case, more than 20° in a positive guidance plane X-Y, which corresponds to the longitudinal section plane illustrated in FIG. 4, and ultimately reduce said angular deviation to less than 5°, as illustrated in FIG. 1.

The interface 30 has, as vertical positive guidance means 50, 50', two lug bodies 52, 52' which can be, for example, integrally formed with the interface body 32 from plastic. The two lug bodies 52, 52' furthermore also define lateral elastic guidance means 50, 50' and therefore have a double function.

In the present case, the positive guidance means include several elements, specifically in particular the lug body edges 51, 51', 53, 53' which interact in a positively guiding manner with the corresponding edges 62, 63, 64, 65 of a corresponding lug guide 60 which is formed as a flat recess 60' in each case, and also in each case two guidance studs 54, 55, 54' for each lug body 52, said guidance studs interacting in a positively guiding manner with two corresponding guidance grooves 70, 71 in the flat recess 60' of the lug guide 60 during assembly.

A latching bore 80 is provided in the proximal end region of the recess 60', a corresponding latching stud 56, 56' latching into said latching bore on the inner side of the lug body 52, 52' in the final assembly position of the interface 30, as is shown in FIG. 3.

The two lug bodies 52, 52' are designed so as to taper in the proximal direction, wherein the tapered portion 53, 53' is designed as a double involute in each case. The proximal end region 64, 65 of the flat recess 60' of the lug guide 60 is likewise designed in a tapering manner in the form of a double involute, so that the two lug bodies 52, 52' each completely fill the corresponding lug guide recess 60', as illustrated in FIG. 1.

Once a worn interface has been removed from the plug base 20, a new and non-worn interface 30 is kept ready in order to be fitted to the plug base 20, as illustrated in FIG. 2. The interface 30 is initially approximately axially aligned with the plug base 20 by a fitter, and then axially pushed onto the plug base 20. In the process, the positive guidance means ensure that the initial angular deviation in the positive guidance plane X-Y is less than 25°. The lug bodies 52, 52' rest on the main face 61 in the recess 60', so that, in a spring plane Y-Z which is perpendicular to the positive guidance plane X-Y, said lug bodies in this way elastically counteract an initial angular deviation in the spring plane Y-Z and are in alignment with the plug base 20. During the further mounting movement, the angular deviation between the plug base 20 and the interface 30 is continuously reduced owing to the abovementioned positive guidance means. At the time at which the interface contacts 32, 34 come into contact with the corresponding base contacts 22, 24, the maximum contact angular deviation is only a few degrees, for example less than 5°.

In the final assembly position illustrated in FIGS. 1 and 3, the two latching studs 56, 56' latch into the corresponding latching bores 80, so that the interface 30 is provisionally secured to the plug base 20. The securing element 40 is then screwed in and in this way the interface 30 is fixed to the plug base 20 such that it cannot be removed without special tools.

Figure 5:
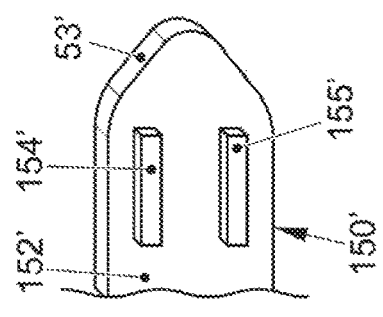
FIG. 5 shows a second exemplary embodiment of an interface lug body of the electric vehicle charging plug of FIG. 1, which interface lug body is provided with two parallel guidance webs.

FIG. 5 shows, by way of example, an alternative embodiment of a lug body 152' of the guidance means 150' which, instead of guidance studs, has two guidance webs 154', 155' which run parallel to one another.

Figure 6:
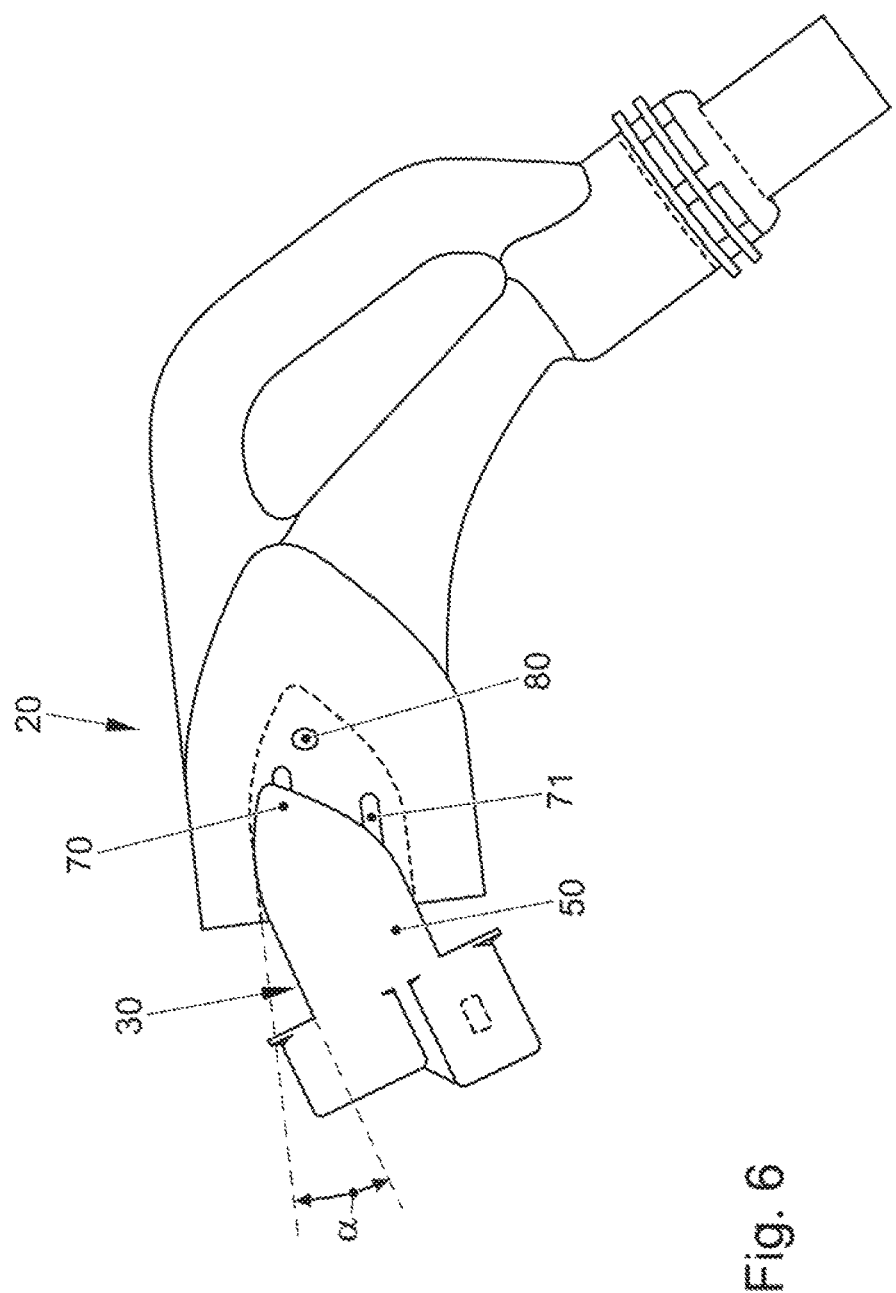
FIG. 6 shows the vehicle plug of FIGS. 1 to 4 in an initial insertion position when plugging-together the interface and the plug base.

FIG. 6 shows the initial angular deviation a when the plug base 20 is initially plugged-together with the interface 30. In the present case, the initial angular deviation 'a' is approximately 20°.

What is claimed is:

1. A land-based electric vehicle charging plug comprising:
   a plug base including an electrically non-conductive base body and at least one charging current base contact; and
   a separate and exchangeable interface which is detachably fastened to the plug base,
   wherein the separate and exchangeable interface has an electrically non-conductive interface body and at least one charging current interface contact which is configured to be connected to the corresponding charging current base contact of the plug base,
   wherein the plug base and the interface each have positive guides which together form an insertion funnel configured to align the plug base and the interface in such a way that, in a course of engaging the positive guides to connect the plug base to the interface, an initial angular deviation in alignment of more than 10° is possible, and the initial angular deviation in alignment is ultimately reduced to less than 5° by the insertion funnel.

2. The land-based electric vehicle charging plug as claimed in claim 1, wherein at least one positive guide is an elastic guide that is configured in such a way that the elastic guide, in a spring plane Y-Z which is perpendicular to a positive guidance plane X-Y, elastically counteracts the initial angular deviation in the spring plane Y-Z.

3. The land-based electric vehicle charging plug as claimed in claim 2, wherein one of the positive guides is a lug body and the mating positive guide is a lug guide, wherein the lug body is configured to engage into the lug guide upon connecting the plug base to the interface.

4. The land-based electric vehicle charging plug as claimed in claim 3, wherein the elastic guide is the lug body which is guided by the corresponding lug guide.

5. The land-based electric vehicle charging plug as claimed in claim 3, wherein the lug body tapers in a proximal direction.

6. The land-based electric vehicle charging plug as claimed in claim 3, wherein the lug body tapers in an involute shape.

7. The land-based electric vehicle charging plug as claimed in claim 3, wherein the lug body is associated with the interface.

8. The land-based electric vehicle charging plug as claimed in claim 1, wherein the positive guides are two lateral lug bodies.

9. The land-based electric vehicle charging plug as claimed in claim 1, wherein the positive guides are configured in such a way that a contact angular deviation at a time at which the charging current interface contact and the charging current base contact are contact-connected to one another during a plugging-together operation is less than 10°.

10. The land-based electric vehicle charging plug as claimed in claim 1, wherein the positive guides are configured in such a way that a contact angular deviation at a time at which the charging current interface contact and the charging current base contact are contact-connected to one another during a plugging-together operation is less than 5°.

11. The land-based electric vehicle charging plug as claimed in claim 1, wherein the interface is fixed to the plug base by a securing element which cannot be opened without tools.

\* \* \* \* \*